United States Patent [19]
Brandt

[11] Patent Number: 5,267,797
[45] Date of Patent: Dec. 7, 1993

[54] COMBINED RADIAL/AXIAL FRICTION BEARING AND METHOD FOR ITS MANUFACTURE

[75] Inventor: Horst Brandt, Weiterstadt, Fed. Rep. of Germany

[73] Assignee: Glyco Metall-Werke Glyco B.V. & Co. KG, Wiesbaden, Fed. Rep. of Germany

[21] Appl. No.: 920,541

[22] PCT Filed: Dec. 19, 1991

[86] PCT No.: PCT/DE91/01011

§ 371 Date: Aug. 12, 1992

§ 102(e) Date: Aug. 12, 1992

[87] PCT Pub. No.: WO92/11468

PCT Pub. Date: Jul. 9, 1992

[30] Foreign Application Priority Data

Dec. 22, 1990 [DE] Fed. Rep. of Germany ....... 4041556
Dec. 6, 1991 [DE] Fed. Rep. of Germany ....... 4140277

[51] Int. Cl.⁵ .............................................. F16C 17/10
[52] U.S. Cl. .................................... 384/275; 384/273; 384/294; 384/295

[58] Field of Search ............... 384/275, 294, 288, 295, 384/273, 272

[56] References Cited

U.S. PATENT DOCUMENTS

| | | | |
|---|---|---|---|
| 4,702,624 | 10/1987 | Fontana | 384/294 |
| 5,114,246 | 5/1992 | Gowan | 384/275 |
| 5,145,264 | 9/1992 | Bryden et al. | 384/275 |

FOREIGN PATENT DOCUMENTS 0298953 1/1989 European Pat. Off. .
2134189 8/1984 United Kingdom .

*Primary Examiner*—Lenard A. Footland
*Attorney, Agent, or Firm*—Herbert Dubno

[57] ABSTRACT

A compound journal and thrust plain bearing comprises a half-liner-shaped or bush-shaped journal bearing part and a part-ring-shaped thrust bearing part or a set of part-ring-shaped thrust bearing parts attached at one or both ends thereof, while every thrust bearing part comprises on its inner peripheral rim a plurality of inwardly extending retaining projections which are angularly spaced from each other and which are inserted into a recess provided in the region of the arcuate or circular margin of the journal bearing part.

12 Claims, 6 Drawing Sheets

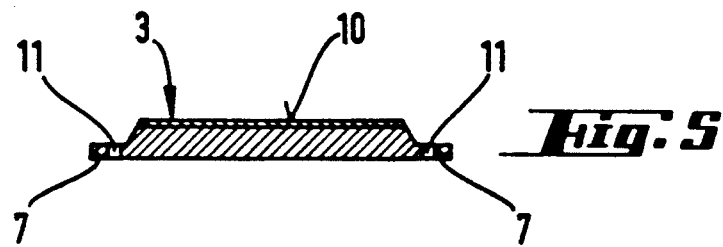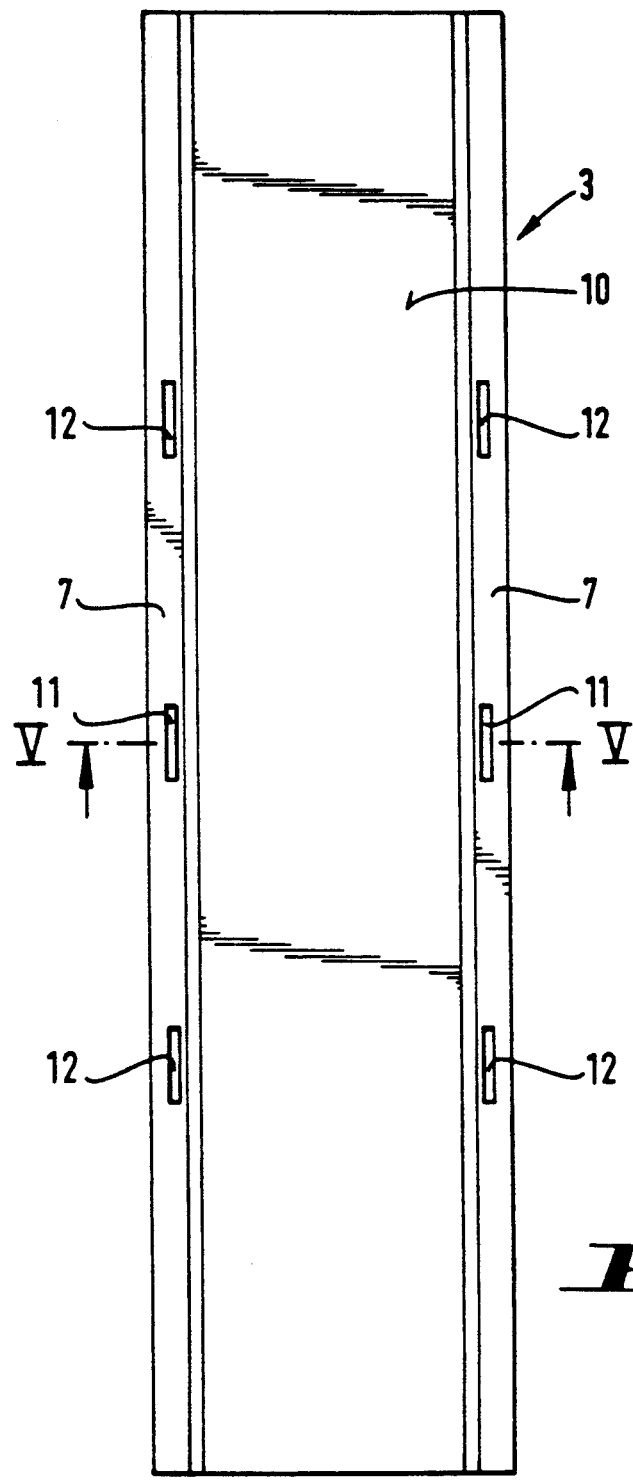

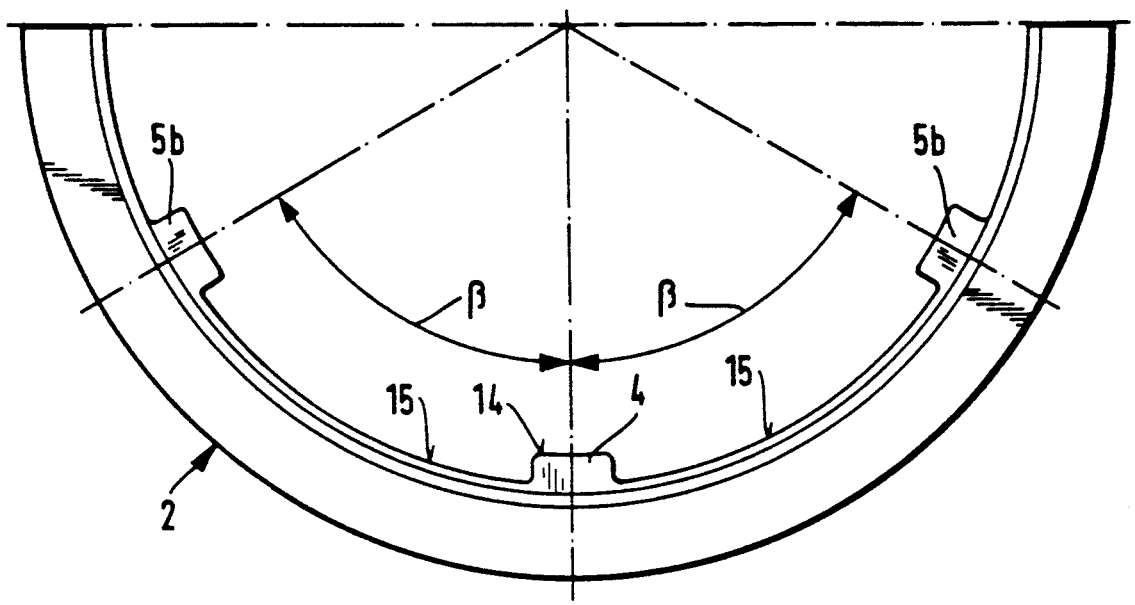
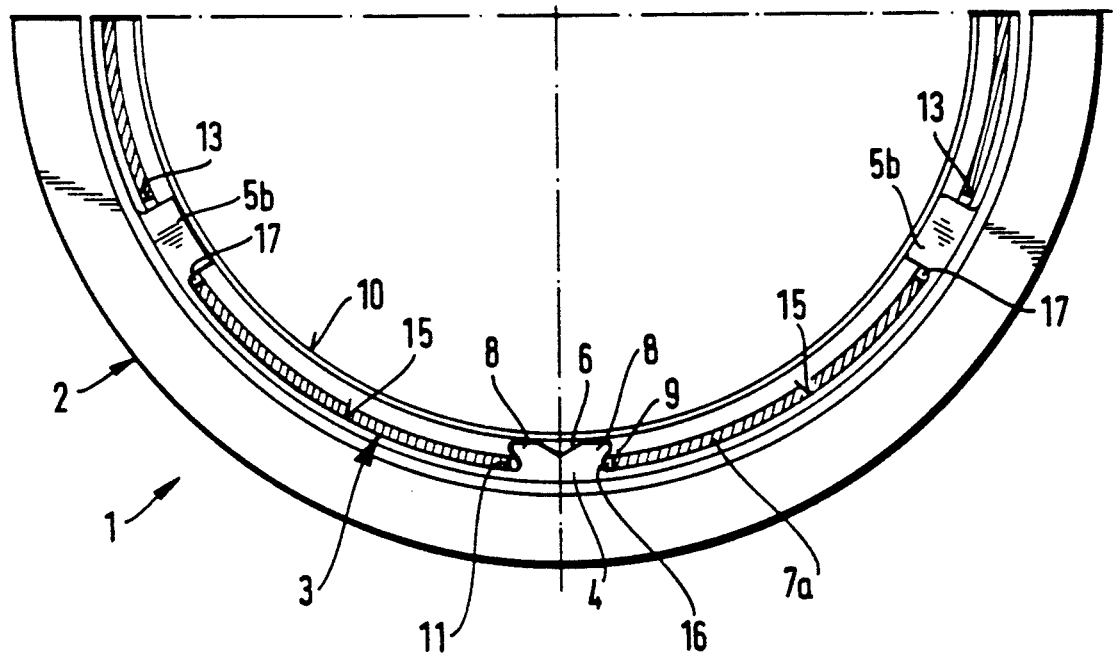

COMBINED RADIAL/AXIAL FRICTION BEARING AND METHOD FOR ITS MANUFACTURE

CROSS REFERENCE TO RELATED APPLICATIONS

This application is a national phase of PCT/DE91/01011 filed 19 Dec. 1991 and based, in turn, on German national applications P40 41 556.2 of 22 Dec. 1990 and P41 40 277.4 of 6 Dec. 1991.

FIELD OF THE INVENTION

My present invention relates to a compound journal and thrust plain bearing comprising a half-liner-shaped or bush-shaped journal bearing part and a part-ring-shaped thrust bearing part or a set of part-ring-shaped thrust bearing parts attached at one or both ends thereof. More particularly, the invention relates to bearings of this type in which each thrust bearing part comprises on its inner peripheral rim a plurality of inwardly extending retaining projections which are angularly spaced from each other and which are inserted into a recess provided in the region of the arcuate or circular margin of the journal bearing part.

The invention also relates to a method for the manufacture of such compound journal and thrust plain bearings.

BACKGROUND OF THE INVENTION

Compound journal and thrust bearings are known from a number of prior publications. They have, in comparison with journal and thrust plain bearings made in one piece (flange bearings), the advantage that for the journal bearing part a different material may be used than for the thrust bearing part so that optimum adaptation of material to the specific loading conditions is possible.

To keep the wear of the bearing parts of a journal and thrust plain bearing as low as possible, the centering and fixing of the bearing parts with respect to each other is of great importance because a certain movability of the thrust bearing part relative to the journal bearing part is desired for the assembly of the plain bearing alone.

DE-OS 26 38 996 describes divided journal and thrust plain bearings in which the thrust bearing parts have noses functioning as retaining projections, which must be bent towards the bearing axis and engage into corresponding recesses made in the journal bearing part and open at the outer edge. Because the bent retaining projections should be supported on the bearing hole of the bearing housing, these retaining projections must be bent with high precision. The peripherally large extent of these retaining projections also requires an expensive bending process.

Finally the arrangement of the recesses does not offer the necessary safe fixing of the bearing parts in axial direction.

EP 298 953 describes a journal and thrust plain bearing composed of a bearing half-liner and a separate thrust flange in which, for the fixing of the flange on the bearing half-liner, the latter is provided with insertion openings which are open towards the outer edge and form a dovetail undercut acting in axial direction.

Corresponding to these insertion openings, fixing attachments are provided on the thrust flange which consist of tongues extending at an angle in axial direction. For this reason, even in the journal and thrust plain bearings known from EP 298 953, the retaining projections must be very long and be bent with high precision.

In order to connect the thrust flange with the bearing inlet, the thrust flange is seated on the bearing half-liner in radial direction. If all fixing attachments have a dovetail shape corresponding to the insertion openings, it is necessary to compress the bearing half-liner to insert the fixing attachments in the insertion openings. This compression eliminates not only the free speed of the bearing half-liner but also deforms the bearing half-liner in addition. This may damage the bearing half-liner.

If only the outer fixing attachments have a dovetail shape and may be inserted in the insertion recesses made for them by the use of the clearance desired between the journal bearing part and the thrust flange, a central fixing attachment must first be rectangularly made and after the seating of the thrust flange on the bearing half-liner widened in dovetail form. This widening in a dovetail form of the bent fixing attachments is difficult and there is a danger that the journal bearing part may be damaged.

In addition parts of a fixing attachment bent in a dovetail form have only a limited strength and retaining reliability and may be detrimental to the precision needed for the retaining projections of these known journal and thrust plain bearings.

DE-OS 33 45 652 and DE-OS 24 12 870 describe flanged half-bearings for use in engines. The connection between the semi-cylindrical bearing liner and the flange is performed by the hooking of radially extending stepped projections in the form of a convex prism in correspondingly profiled recesses of the journal bearing part which are open towards the outer edge but converge.

These recesses are situated on the arcuate edges of the liners. In this connection certain angular positions of the recesses and radially extending projections must be taken into consideration. It is disadvantage of this kind of connection that the manufacture is expensive because narrow tolerances must be achieved in the design and arrangement of the prisms and the recesses in addition to the angular positions. The prisms are furthermore stepped, embossed or milled. During assembly the journal bearing part must be deformed beyond normal measure. When, after the mounting of the flanged half-bearing, the free spread of the bearing liner is eliminated, the thrust bearing parts are no longer fixed and may even fall off the bearing liner.

GB-PS 22 10 113 describes a combined journal and thrust bearing in which the thrust bearing part has radially inwardly projecting fixing projections of rectangular shape and which engage in recesses of the journal bearing part which are undercut in axial direction. The manufacturing cost is, in this case, very high because undercut grooves must be made in the bearing liner.

A compound journal and thrust plain bearing is described in DE-PS 21 40 854 in which the thrust bearing part has radially inwardly extending slanted retaining projections which engage in corresponding axially recesses on the peripheral rim of the journal bearing part. In order to hold the thrust bearing part seated on the journal bearing part, small catches are provided on the recesses of the journal bearing part which should engage over the slanting of the retaining projections. Apart from the fact that such catches in the recesses of the journal bearing part require high precision and consequently high manufacturing costs, the attachment of the thrust bearing part to the journal bearing part is thereby not achieved with necessary reliability.

It is, therefore, an object of the invention to provide a compound journal and thrust plain bearing and also a method for its manufacture which ensures reliable fixing of the thrust bearing part on the journal bearing part and requires only a few working steps so that a cost-effective manufacture is achieved.

SUMMARY OF THE INVENTION

This object is achieved by a compound journal and thrust plain bearing in which, for every thrust bearing part, at least one recess in the form of an enclosed retaining opening is formed in the peripheral rim of the journal bearing part for a retaining projection serving as a fixing projection. The relevant fixing projection of the thrust bearing part which is provided with noses extending through the recess and extending over the journal bearing part. All retaining projections have in the recess which receives them a clearance in a peripheral direction and a clearance in an axial direction of the journal bearing part. The noses are spaced by a distance, forming a predetermined radial clearance of the thrust bearing part with respect to the journal bearing part, from the portion of the inner surface of the journal bearing part over which they extend.

Rivetting with shanks of rectangular cross-section is shown on page 176 of the book "Feinmechanische Bauelemente" by S. Hildebrand, published by Hansen Verlag, Munich, Vienna 1978. This known rivetting enables only rigid connections and not connections movable within limits.

By making the recess admitting the fixing projection as an enclosed retaining opening, the advantage of greater stability of the journal bearing part and considerably improved stability of the connection between the journal bearing part and the thrust bearing part are achieved.

In addition the proportion of the contact area of the journal bearing part is not restricted and the journal bearing part is better formed. The enclosed retaining opening has further the advantage that it ensures also a much increased reliability in the attachment of the thrust bearing part in axial direction.

In the formation of the retaining noses a spacing of every retaining nose from the inner surface portion of the journal bearing part over which it extends is produced according to the invention and this ensures that the connection on the journal bearing part is reliable but sufficiently movable to meet all requirements during the assembly of the bearing, during the adaptation of the bearing, to its admission in a bearing housing and also in the operation of the bearing.

In a preferred embodiment of the invention the fixing projection has in the assembled state of the journal and thrust plain bearing provided centrally a least one depression from which extend to both sides two retaining noses extending over the journal bearing part in the region of the retaining opening. The inwardly extending fixing projection of the thrust bearing part may have initially a substantially rectangular shape so that the central depression is made during the formation of the noses. However, the fixing projection may also be a prefabricated with a central depression.

In addition to this fixing projection also guiding projections, preferably two guiding projections, may be provided. When the angular distance of these guiding projections from the fixing projection is not greater than 30°, the guiding projections may also engage into retaining recesses provided on the peripheral rim of the journal bearing part when use is made of the provided clearance. When the angular distance of the guiding projections from the fixing projection is greater, the peripheral rim of the journal bearing part is provided with axially open cut-outs in which are inserted the guiding projections when, after insertion of the fixing projection into the retaining opening, the journal bearing part is laterally tilted on the journal bearing part.

For the manufacture of the compound journal and thrust plain bearing, first the journal bearing part and the thrust bearing part are made while the thrust bearing part has at least one substantially rectangular, radially inwardly extending retaining projection serving as a fixing projection. As one manufacturing step on the journal bearing part at least one retaining opening for the fixing projection is stamped in the peripheral rim region. According to their position relative to the fixing projection either axially enclosed retaining openings or axially open cut-outs are stamped on the journal bearing part for the guiding projections. For the assembly of the thrust bearing part and the journal bearing part fixing projection of the thrust bearing part is inserted in the retaining opening in the journal bearing part which is provided therefor. The guiding projections of the thrust bearing part, when arranged closer to the fixing projection, are introduced into the retaining openings simultaneously with the fixing projection. If the guiding projections are arranged with a greater angular distance from the fixing projection, the thrust bearing part, after insertion of the fixing part in the retaining opening provided therefor, is tilted on the peripheral rim of the journal bearing part, while the guiding projections are inserted into the cut-outs provided for them. After the thrust bearing part has been seated in this way on the journal bearing part, retaining noses are pressed on the fixing projection of the thrust bearing part by a specially formed punch, such that these retaining noses extend over a portion of the inner surface of the journal bearing part adjacent to the retaining opening but retain a distance from this inner surface.

This widening may be accomplished or prepared by the provision of at least one notch in the inwardly facing edge of the fixing projection. This notch has the advantage that enough material may be provided on the fixing projection for the formation of the fixing noses without a danger that the fixing projection could extend into the region of movement of the bearing journal.

A compound journal and thrust plain bearing according to the invention and its manufacture have the advantage that the journal bearing part need not be compressed or widened during assembly, that the assembly can be performed simply and that there is no danger than damage could be caused during assembly on one or the other part of the bearing. The bearing has finally the advantage that reliable holding together and a good movability between the thrust bearing part and the journal bearing part are retained.

BRIEF DESCRIPTION OF THE DRAWING

The above and other objects, features and advantages of the invention will become more readily apparent from the following description, reference being made to the accompanying highly diagrammatic drawing in which:

FIG. 4 is a developed view of an unrolled journal bearing part according to FIG. 1;

FIG. 5 is a section through the journal bearing part along line V—V of the embodiment shown in FIG. 4;

FIG. 8 is a plan view of a thrust bearing part according to FIG. 7 before assembly;

FIG. 9 is a plan view of a thrust bearing part according to FIG. 7 assembled with a journal bearing part;

SPECIFIC DESCRIPTION

Figure 1:
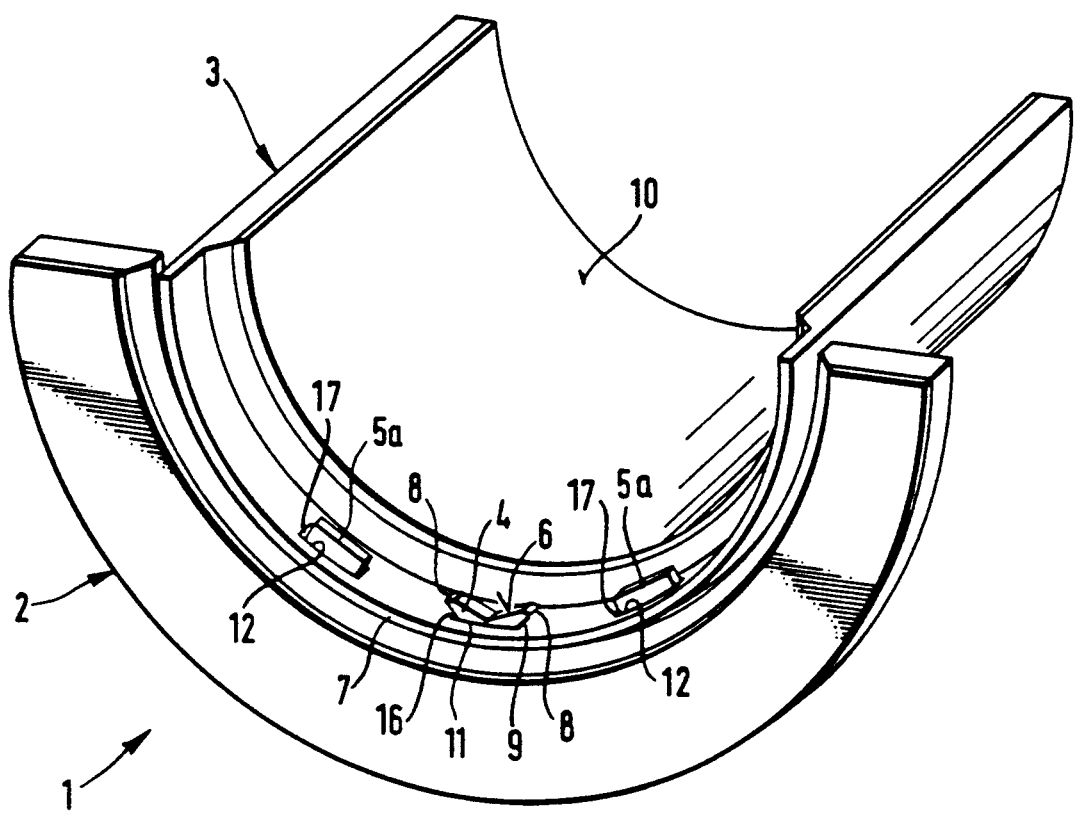
FIG. 1 is a perspective view of the compound journal and thrust plain bearing of the invention in a first embodiment.
Figure 2:
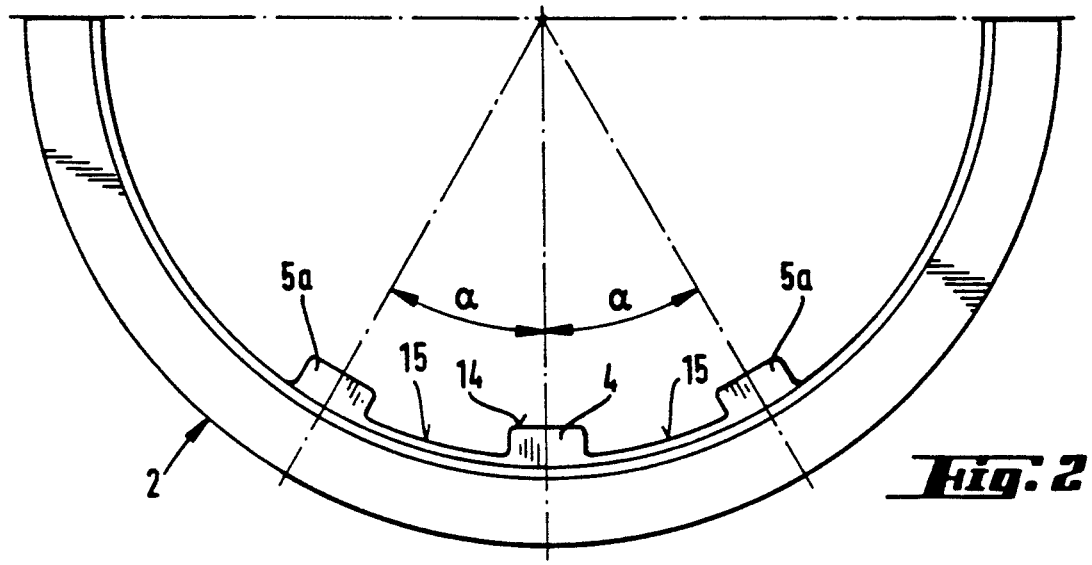
FIG. 2 is a plan view of a thrust bearing part according to FIG. 1 before assembly.

The representations in the drawings show a journal and thrust plain bearing 1, the journal bearing part 3 of which is in the form of a substantially semicylindrical bearing liner. The thrust bearing part 2 is formed by a half-ring-shaped thrust plate situated at one or both ends on the arcuate end face of the journal bearing part.

The thrust bearing part 2 is provided at its inner peripheral rim with inwardly facing retaining projections 4 and guiding projections 5a, 5b.

In the embodiment shown in FIGS. 1 to 6 the thrust bearing part 2 is provided with a central fixing projection 4 flanked by an angular distance α of about 30° with two guiding projections 5a. Between the central fixing projection 4 and the lateral guiding projections 5a is formed an abutment rim 15 projecting with respect to the inner periphery of the thrust bearing part 2.

Figure 3:
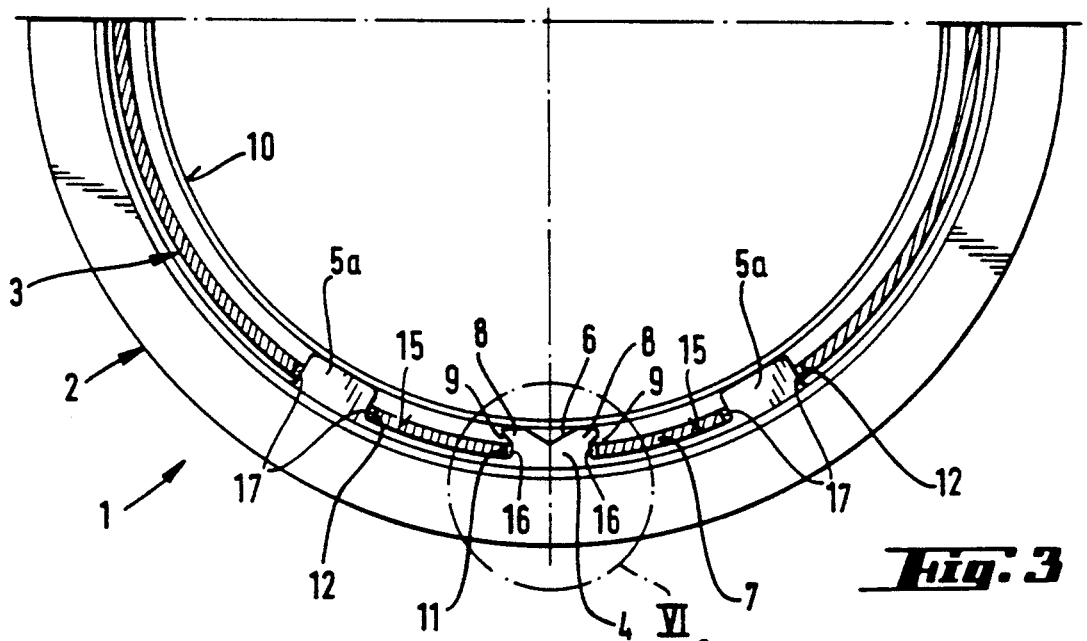
FIG. 3 is a plan view, partly broken away, of a thrust bearing part according to FIG. 1 assembled with a journal bearing part.
Figure 6:
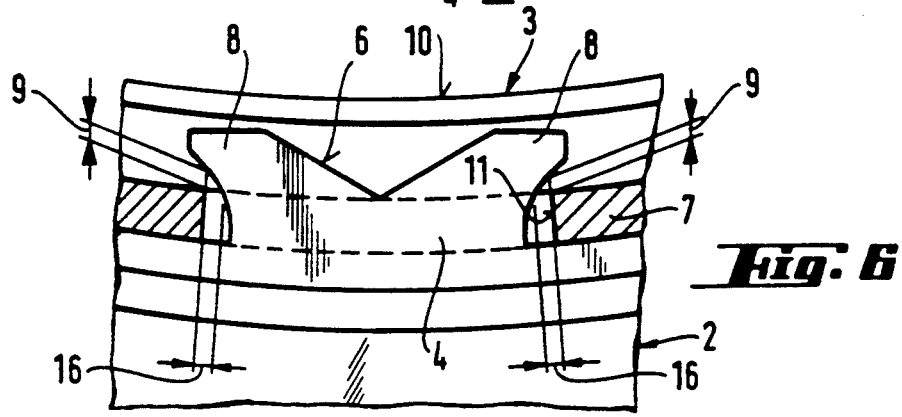
FIG. 6 is a detail of the region VI from FIG. 3.
Figure 7:
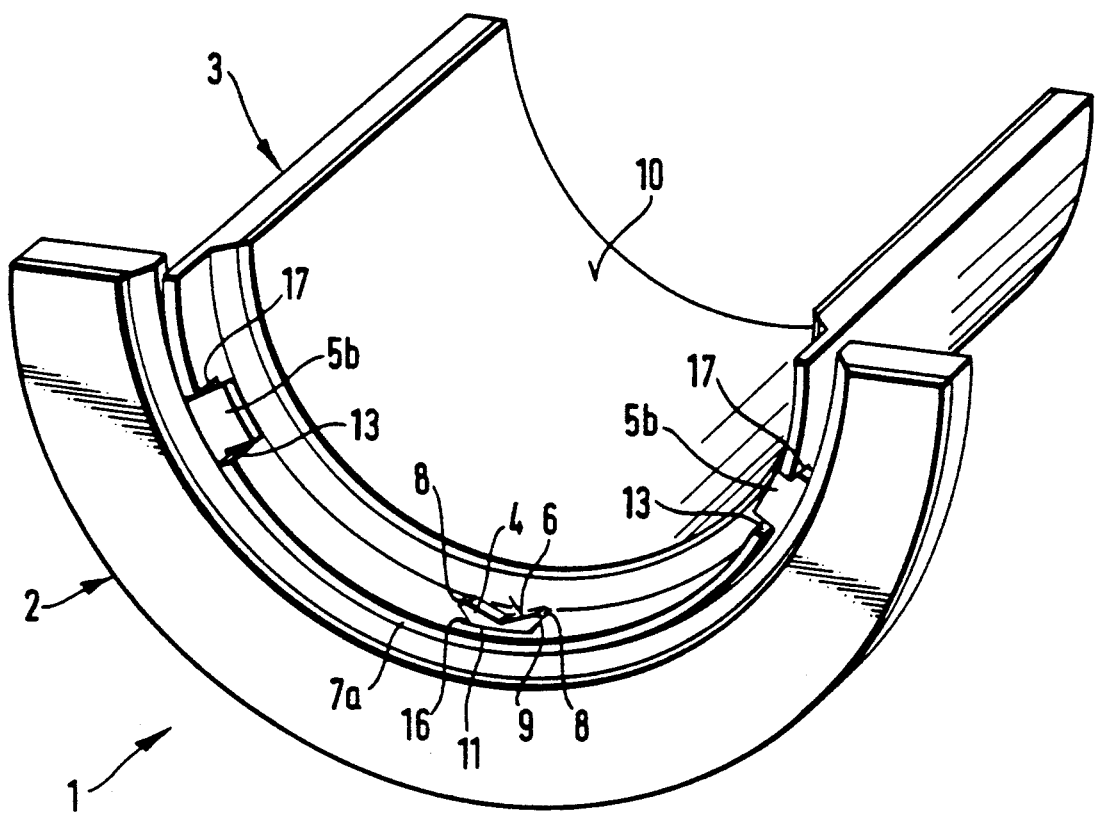
FIG. 7 is a perspective view of the compound journal and thrust plain bearing in a second embodiment of the invention.
Figures 10, 11, 12:
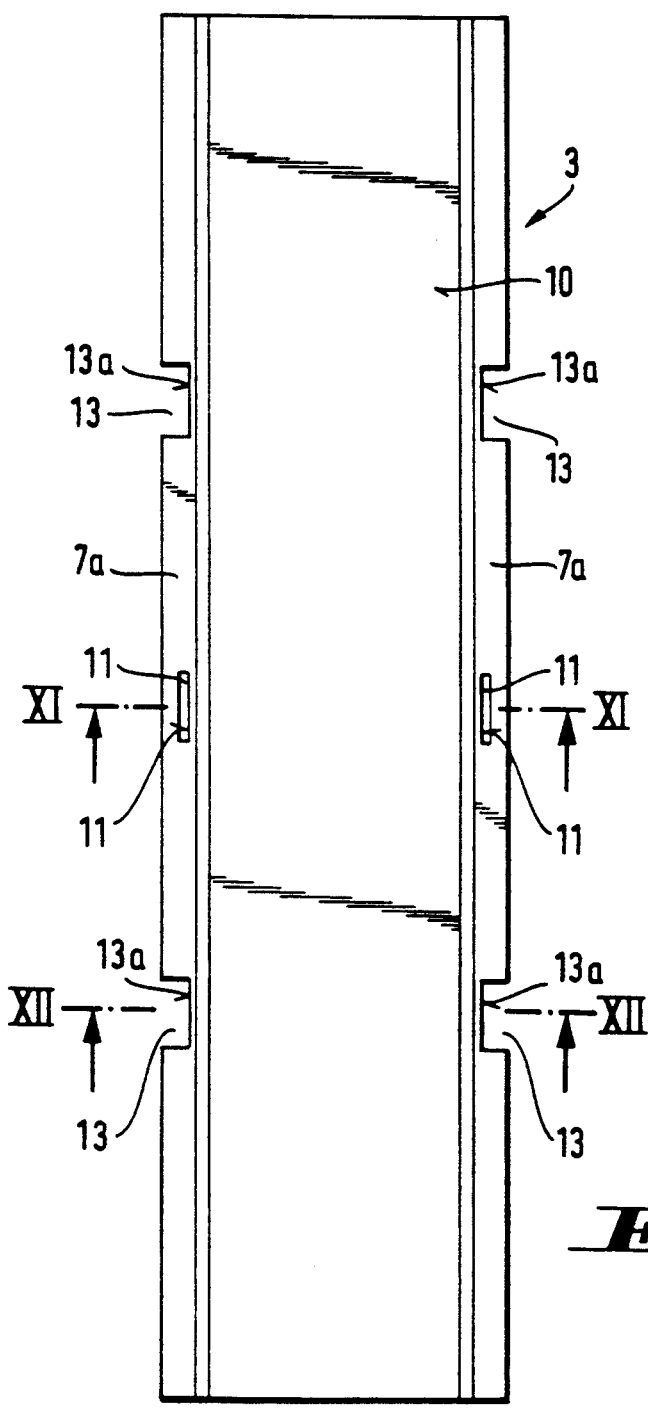
FIG. 10 is a developed view of an unrolled journal bearing part according to FIG. 7.
FIG. 11 is a section through the journal bearing part according to FIG. 10 along line XI—XI.
FIG. 12 is a section through a journal bearing part taken along line XII—XII in FIG. 10.

The fixing projection 4 and the two lateral guiding projections 5a engage into retaining openings 11 and 12 on the rim 7 of the journal bearing part. To enable interconnection of the journal bearing part 3 and the thrust bearing part 2, the retaining openings 11 and 12 have a length which in the peripheral direction of the journal bearing part 3 is somewhat greater than the peripheral length of the fixing projection 4 and the guiding projections 5, so that—as shown in FIGS. 3 and 6—a peripheral clearance 16 of the retaining projection 4 in the retaining opening 11 and of the guiding projections 5a in the retaining openings 12 is obtained.

In spite of the initial substantially rectangular shape of the fixing projection 4 and the remaining substantially rectangular shape of the guiding projections 5a, the retaining projection 4 and of the lateral guiding projections 5a, at opposite angular distances α of about 30° may still be inserted, in view of the this clearance, in the retaining openings 11 and 12.

After the fixing projection 4 and the retaining projections 5a have been inserted into the retaining openings 11 and 12 so far that the abutment rim 15 is in contact, the fixing projection 4 is at its inwardly facing edge 14 provided with a central outwardly facing depression 6 and from this depression 6 the material of the fixing projection is displaced outwardly whereby retaining noses 8 are formed which reach in peripheral direction beyond the end edges of the retaining opening 11. The displacement is effected only so far that the retaining noses 8 keep a spacing 9 from the inner surface of the marginal area 7 on the journal bearing part 3. This spacing 9, together with the clearance 16 of the fixing projection 4 in the retaining opening 11 and the possibly somewhat greater clearance 17 of the guiding projections 5a in the retaining openings 12, ensures sufficient movability of the thrust bearing part 2 on the journal bearing part 3, while the attachment is nevertheless secure.

While FIG. 1 shows a thrust bearing part 2 positioned only at one end of a journal bearing part 3, one thrust bearing part or a set of thrust bearing parts 2 may correspondingly be situated at each end of the journal bearing part 3.

FIGS. 4 and 5 show the arrangement of the rectangular retaining openings 11 and 12 on both rim regions 7 at the ends of a journal bearing part 3.

In the embodiment of to FIGS. 7 to 12 every thrust bearing part 2 is again retained on the rim region 7 of the journal bearing part by one fixing projection 4 and two lateral guiding projections 5b. Here the arrangement of the guiding projections 5b is modified in comparison with the embodiment of FIGS. 1 to 6 in that the guiding projections 5b are spaced from the central fixing projection 4 at an angular distance B which is greater than 30°. This arrangement has the advantage that the thrust bearing parts 2 are prevented from radially falling off the journal bearing part 2 even when the retaining noses 8 are not present due to wear or other reasons.

To enable in this embodiment the assembly of the bearing parts, i.e. the journal bearing part 3 and the thrust bearing part 2, a central retaining opening 11 and lateral cut-outs 13, the base edge 13a of which is aligned with the inner edge 11c of the retaining opening 11, are provided in the rim region 7a or both rim regions 7a of the journal bearing part. Between the edges of the retaining opening 11 and the peripheral end edges of the fixing projection 4 and also between the peripheral end edges of the guiding projections 5b and the end edges of the cut-outs 13 a clearance 16 is again provided which ensures movability of the thrust bearing part 2 with respect to the journal bearing part 3. The guiding projections 5b have also a peripheral clearance 16 in the cut-outs 13 which is substantially identical to that of the fixing projection 4 in the retaining opening 11. Also in this embodiment an arcuate abutment rim 15 extends on the inner peripheral edge of the thrust bearing part 2 between the guiding projections 5b and the fixing projection 4.

For the assembly of the journal and thrust plain bearing in this example the fixing projection 4 of the thrust bearing part 2 is inserted into the retaining opening 11 of the journal bearing part in an inclined position of the thrust bearing part 2 and for this purpose also some clearance is provided between the peripherally extending edges of the retaining opening 11, and the thickness of the fixing projection 4. After insertion of the fixing projection 4 into the retaining opening 11 until the abutment rim 15 is in contact with the outer surface of the rim region 7 on the journal bearing part 3, the thrust bearing part 2 is tilted to the end of the journal bearing part 3, and the guiding projections 5b enter the axially open cut-outs 13. Then, as in the embodiment of FIGS. 1 to 6 the retaining noses 8 are formed on the fixing projection 4 so that the thrust bearing part 2 is securely held on the journal bearing part 3 while having desired movability with respect to the journal bearing part 3.

The formation of the central recess 6 or notches is of particular advantage in both embodiments of the invention because in this way the fixing projection 4 is at its edge 14 held in a safe radial distance from the sliding surface 10 of the journal bearing part 3.

LIST OF REFERENCE NUMERALS

1 Journal and thrust plain bearing
2 Thrust bearing part
3 Journal bearing part
4 Fixing projection
5a, 5b Guiding projection
6 Depression, notch
7 Rim region on journal bearing part
7a Rim
8 Retaining nose
9 Spacing
10 Sliding surface of journal bearing part
11 Enclosed retaining opening
11c Inner edge
12 Enclosed retaining opening
13 Axially open cut-out
13a Base edge
Edge of fixing projection
Abutment rim
16 Clearance
17 Clearance

I claim:

1. Compound journal and thrust plain bearing comprising a half-liner-spaced or bush-shaped journal bearing part and a part-ring-shaped thrust bearing part or a set of part-ring-shaped thrust bearing parts attached at one or both ends thereof, while every thrust bearing part comprises on its inner peripheral rim a plurality of inwardly extending retaining projections which are angularly spaced from each other and which are inserted into a recess provided in the region of the arcuate or circular margin of the journal bearing part, characterised in that for every thrust part (2) at least one recess in the form of an enclosed retaining opening (11) is provided in the peripheral rim of the journal bearing part (3) for a retaining projection serving as a fixing projection (4), through which recess extends the relevant fixing projection (4) of the thrust bearing part (2) which is provided with noses (8) formed thereon and extending over the journal bearing part (3), while all retaining projections (4, 5) have in the recess (11, 12, 13) which receives them a clearance in peripheral direction and a clearance in axial direction of the journal bearing part (3) and the noses (8) are spaced a distance (9), forming a predetermined radial clearance of the thrust bearing part (2) with respect to the journal bearing part (3), from the portion of the inner surface of the journal bearing part (3) over which they extend.

2. Plain bearing according to claim 1 characterised in that the fixing projection (4) has on its radially inwardly facing rim a recess (6) from which are formed to both sides two noses (8) extending over the journal bearing part (3).

3. Plain bearing according to claim 1 characterised in that at least one guiding projection (5a,5b) without retaining noses is provided in addition to the fixing projection (4) with retaining noses (8).

4. Plain bearing according to claim 3 characterised by the arrangement of a centrally situated fixing projection (4) with retaining noses (8) formed thereon and two guiding projections (5a,5b) without retaining noses flanking the fixing projection on both sides at an angular distance $(\alpha,\beta)$.

5. Plain bearing according to claim 4 characterised in that the two flanking guiding projections (5a,5b) are arranged to an angular distance of up to 30° C. $(\alpha \leq 30°)$ with respect to the central fixing projection (4) and engage each, possibly with an increased clearance in peripheral direction in an enclosed retaining opening (12) in the journal bearing part (3).

6. Plain bearing according to claim 4 characterised in that the two flanking guiding projections (5a,5b) are arranged with respect to the central fixing projection (4) with an angular distance of more than 30° $(\beta \leq 30°)$ and engage each into an axially outwardly open cut-out (13) on the rim of the journal bearing part (3) while the base edge (13a) of this cut-out (13) is aligned with the axially inner edge (11c) of the retaining opening (11) for the central fixing projection (4).

7. A compound journal and thrust bearing, comprising:

an axially extending journal bearing part conforming to at least a segment of a cylinder;
at least one thrust bearing part conforming to at least a segment of a ring, lying in a plane perpendicular to an axis of said journal bearing part, and extending around and conforming to said journal bearing part at at least one end thereof
at least one peripherally closed throughgoing recess formed in said segment of said journal bearing part at said end thereof; and
a respective projection on said segment of said segment of said thrust bearing part extending radially through said recess and formed with a pair of noses overhanging edges of recess with radial clearance from said segment of said journal bearing part, said projection being received in said recess with peripheral clearance.

8. The compound journal and thrust bearing defined in claim 7 wherein said projection is formed with an outwardly tapering notch between said noses, said projection being flat and said recess being elongated in a peripheral direction.

9. The compound journal and thrust bearing defined in claim 8, further comprising a pair of additional recesses formed in said segment of said journal bearing part angularly equispaced from the first-mentioned recess and receiving with peripheral clearance respective radial lugs of said segment of said thrust bearing part.

10. The compound journal and thrust bearing defined in claim 9 wherein said additional recesses and said lugs are angularly spaced respectively from said first-mentioned recess and said projection by an angle $\alpha \leq 30°$.

11. The compound journal and thrust bearing defined in claim 9 wherein said additional recesses are axially open along an edge of said journal bearing part, and said lugs are angularly spaced respectively from said first-mentioned recess and said projection by an angle $\beta \geq 30°$.

12. The compound journal and thrust bearing defined in claim 9 wherein said end of said segment of said journal bearing part is formed with a step along an inner side thereof at said end, said lugs and projection extending into said step.

* * * * *